United States Patent [19]

Sawada et al.

[11] Patent Number: 4,984,345
[45] Date of Patent: Jan. 15, 1991

[54] JIG FOR FIXING BEARING

[75] Inventors: Michinori Sawada; Norio Watanabe; Yoshiaki Endo, all of Tokyo, Japan

[73] Assignee: Tsukishima Kikai Co., Ltd., Tokyo, Japan

[21] Appl. No.: 427,388

[22] Filed: Oct. 27, 1989

Related U.S. Application Data

[63] Continuation-in-part of Ser. No. 404,386, Sep. 8, 1989, abandoned.

[30] Foreign Application Priority Data

Sep. 9, 1988 [JP] Japan ............................ 63-117884[U]

[51] Int. Cl.⁵ .............................................. B23P 19/04
[52] U.S. Cl. ........................................................ 29/263
[58] Field of Search ................. 29/256, 258, 259, 263, 29/264, 265, 266, 280

[56] References Cited

U.S. PATENT DOCUMENTS

| | | | |
|---|---|---|---|
| 1,599,340 | 9/1926 | Malone | 29/259 |
| 2,591,622 | 4/1952 | Shoup . | |
| 3,957,319 | 5/1976 | Gorski . | |
| 4,285,111 | 8/1981 | Dubach | 29/263 |

FOREIGN PATENT DOCUMENTS

| | | | |
|---|---|---|---|
| 89/00477 | 1/1989 | PCT Int'l Appl. | 29/263 |
| 818853 | 5/1981 | U.S.S.R. | 29/263 |
| 1063166 | 3/1967 | United Kingdom . | |

Primary Examiner—Robert C. Watson
Attorney, Agent, or Firm—Armstrong, Nikaido, Marmelstein, Kobovcik & Murray

[57] ABSTRACT

According to the present invention, a jig for fixing a bearing with a tapered bore through a tapered adapter sleeve on a rotational shaft comprises a positioning member which is attached to a housing receiving the bearing and which has a positioning surface for positioning the bearing in the axial direction, and drawing means which engages with the tapered adapter sleeve and which have driving means for moving the drawing means axially so that the tapered adapter sleeve is moved toward the positioning member. Movement of the tapered adapter sleeve generates strong fixing forces between the tapered bore and the tapered adapter sleeve and between the tapered adapter sleeve and the shaft. The positioning surface contacts with an end of inner ring of the bearing, which is located on the small diameter side of tapered bore.

11 Claims, 10 Drawing Sheets

JIG FOR FIXING BEARING

CROSS REFERENCE TO RELATED APPLICATION

This is a continuation in part of patent application Ser. No. 404,386 filed on Sept. 8, 1989.

BACKGROUND OF THE INVENTION AND RELATED ART STATEMENT

The present invention relates to a jig for fixing a bearing on a rotational shaft, and particularly relates to a jig for fixing a bearing with a tapered bore on an end of shaft.

Figure 7A:
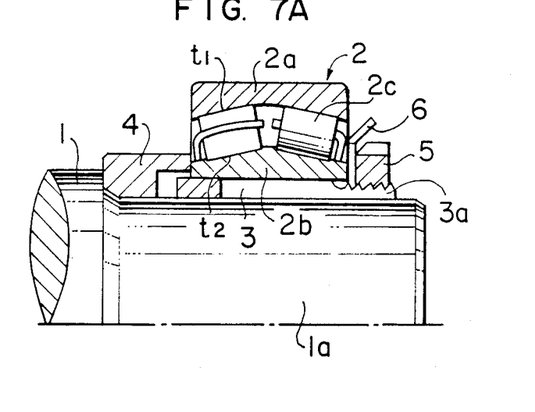
FIG. 7A is a partially cross-sectional view showing an example of a conventional jig for fixing a bearing.
Figure 7B:
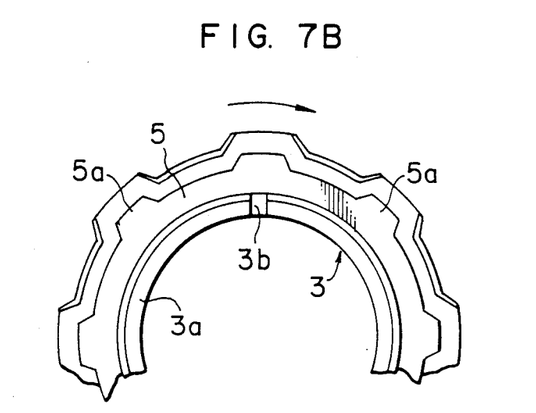
FIG. 7B is a front view showing an adapter nut of the conventional jig.
Figure 7C:
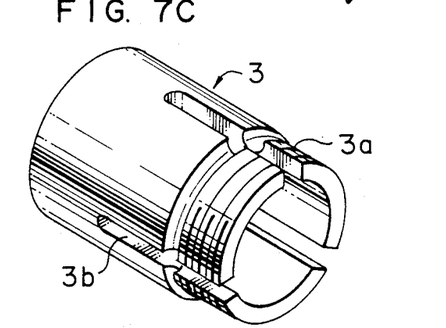
FIG. 7C is a schematic view showing a tapered adapter sleeve.

Conventional methods for fixing a bearing with a tapered bore on a rotational shaft are described on pages 92 and 93 of "Korogari-jikuuke no ouyou sekkei" which was published by "Taiga shuppan" on June 1, 1983 and whose author is "Sigeru Ono". In a first method described therein, as shown in FIG. 7A, a collar 4 for setting the bearing on the predetermined position is mounted on an shaft end 1a and subsequently a tapered adapter sleeve 3 is mounted on the shaft end 1a. As shown in FIG. 7C the tapered adapter sleeve 3 has a screw portion 3a on a thin side thereof and has a plurality of slits 3b extending axially from an end of the thin side to a thick side thereof. The thick side is arranged near the collar 4 in comparison with the thin side.

Figure 7D:
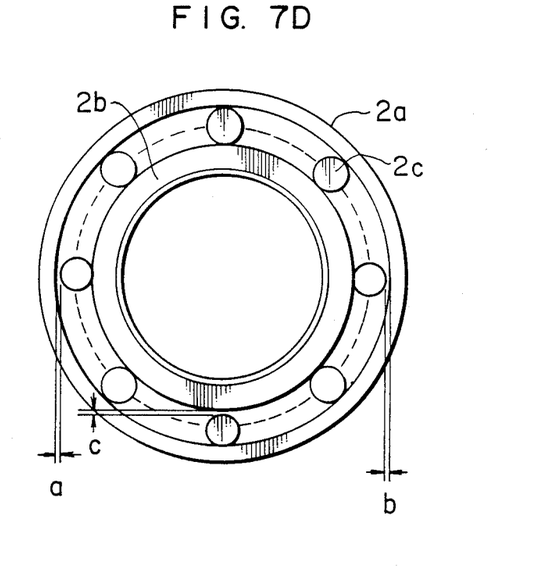
FIG. 7D is a schematic view showing bearing clearances.

The bearing 2 with tapered bore, an adapter washer 6 and an adapter nut 5 are mounted on the tapered sleeve 3. The adapter nut 5 engages with the screw portion 3a. When the adapter nut 5 is rotated so that the thick side of the adapter sleeve 3 is moved towards the adapter nut 5 and the tapered outer surface of the adapter sleeve 3 is pressed against the surface of the tapered bore of the bearing 2, the widths of the slits 3b and the diameter of the inner surface of the tapered adapter sleeve 3 are decreased, so that the bearing 2 is fixed on the shaft end 1a by large pressing force generated between the inner surface of the tapered adapter sleeve 3 and the surface of the shaft end 1a. In order to rotate the adapter nut 5 with large torque for large pressing forces between the bearing 2 and the adapter sleeve 3 and between the bearing 2 and the shaft 1, an engaging tool (not shown) is fitted onto a boss 5a of the adapter nut 5 shown in FIG. 7B and is struck with a hammer. The degree of rotation of the adapter nut 5 is controlled in accordance with the bearing clearance which is the amount of clearances t1 between an outer ring 2a and a rolling element 2c and t2 between an inner ring 2b and the rolling element 2c, as shown in FIG. 7A. The bearing clearance is the average of the horizontal bearing clearance and the vertical bearing clearance. The horizontal bearing clearance is the amount of clearances a and b measured at two positions of the orbital path of the rolling elements 2c on the level of the axis of the shaft 1, as shown in FIG. 7D. The vertical bearing clearance c is measured at the lowest position of the orbital path of the rolling elements 2c. These clearances are measured with a clearance gauge. When the bearing clearance reaches the suitable residual clearance (for example, bearing clearance/shaft diameter is 0.045 mm/100 mm), the rotation of the adapter nut 5 is stopped. Subsequently, the peripheral portion of the adapter washer 6 is bent and engages with the adapter nut 5, so that the adapter nut 5 is fixed.

Figure 8:
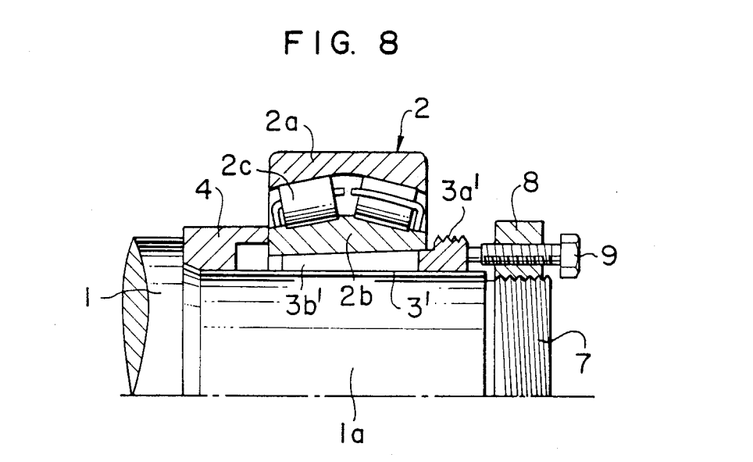
FIG. 8 is a cross-sectional view showing another example of a conventional jig.

In a second method, the shaft 1 has a screw portion 7 at the outer side of the shaft end 1a, as shown in FIG. 8. The collar 4 contacting with a step portion of the shaft 1 for setting the bearing 2 on the predetermined position is mounted on the shaft end 1a and subsequently the tapered adapter sleeve 3' is mounted on the shaft end 1a. The tapered adapter sleeve 3 has a screw portion 3a' on a thick side thereof and has a plurality of slits 3b' extending axially from an end of a thin side to the thick side thereof. The thin side is arranged near the collar 4 in comparison with the thick side. The one end of the inner ring 2b contacts with the end of the collar 4. A removable sleeve 8 is mounted on the screw portion 7. The removable sleeve 8 has a plurality of bolts 9 arranged at the peripheral portion. The tapered sleeve 3' is pressed towards the collar 4 by the bolts 9 rotated suitably so that the bearing 2 is fixed on the shaft 1 through the tapered sleeve 3' pressed between the shaft 1 and the bearing 2. The degrees of rotation of the bolts 9 are controlled in accordance with the bearing clearance, as described in the first method. When the bearing clearance reaches the suitable residual clearance, the rotations of the bolts 9 are stopped.

In the first method described above, the positional relation between the bearing 2 and the shaft 1 is correct but the bearing 2 can not be fixed at the correct position of the bearing housing. And further, in order to rotate the adapter nut 5 for drawing the sleeve 3, means for preventing the shaft 1 from rotating on its own axis is necessary.

In the second method described above, as the first method, the positional relation between the bearing 2 and the shaft 1 is correct but the bearing 2 can not be fixed at the correct position of the bearing housing. And the means for preventing the shaft 1 from rotating on its own axis is not necessary but the additional shaft portion with screw which is used only for pressing the tapered sleeve 3' and which is not used after fixing the bearing 2 is necessary.

OBJECTS AND SUMMARY OF THE INVENTION

The object of the present invention is to provide a jig for fixing a bearing with a tapered bore on a rotational shaft through a tapered adapter sleeve arranged between the tapered bore and the rotational shaft and for mounting the bearing at a correct position relative to the bearing housing. The jig does not need means for preventing the shaft from rotating on its own axis during using the jig and does not need an additional shaft portion with a screw which is used only for using the jig and which is not used after using the jig.

According to the present invention, a jig for fixing a bearing with a tapered bore through a tapered adapter sleeve on a rotational shaft, comprises, a positioning member which is attached to a housing receiving the bearing and which has a positioning surface for positioning the bearing in the axial direction, the positioning surface contacting with an end of inner ring of the bearing, which end of inner ring is located on the small diameter side of the tapered bore, and drawing means which engages with the tapered adapter sleeve and which have driving means for moving the drawing means axially so that the tapered adapter sleeve is moved toward the positioning member for generating strong fixing forces between the tapered bore and the tapered adapter sleeve and between the tapered adapter sleeve and the shaft.

Since the jig according to the present invention has the positioning member which is attached to the housing and which has the positioning surface for positioning axially the bearing, the bearing is positioned at a correct position in relation to the housing. And further since the jig according to the present invention has drawing means which engages with the tapered adapter sleeve and which have driving means for moving the drawing means axially, the jig does not need means for preventing the shaft from rotating on its own axis when using the jig and does not need an additional shaft portion with a screw which is used only for using the jig and which is not used after using the jig.

If the jig according to the present invention further comprises shaft pressing means for varying the distance between the drawing means and the shaft, the bearing can be positioned at a correct position in relation to the shaft.

If the positioning member of the jig according to the present invention further comprises an outer ring positioning surface which contacts with an end of outer ring of the bearing, which end of outer ring is located on the small diameter side of tapered bore, the outer ring can be positioned at a correct position in housing.

DETAILED DESCRIPTION OF PREFERRED EMBODIMENT

Figure 1A:
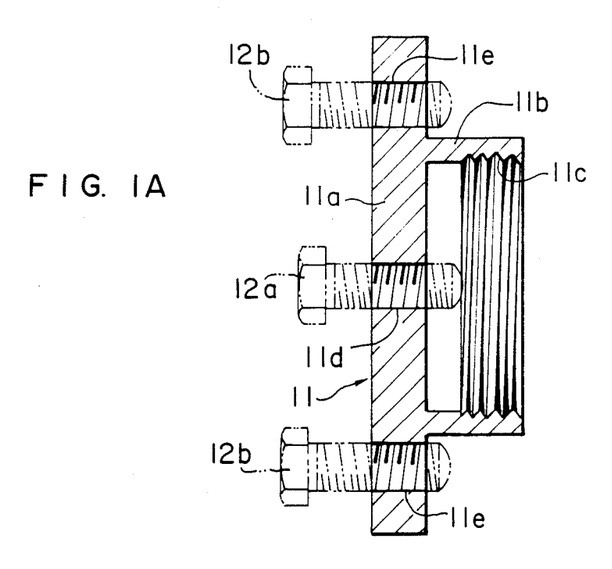
FIG. 1A is a cross-sectional view showing an embodiment of the drawing member of jig according to the present invention.
Figure 1B:
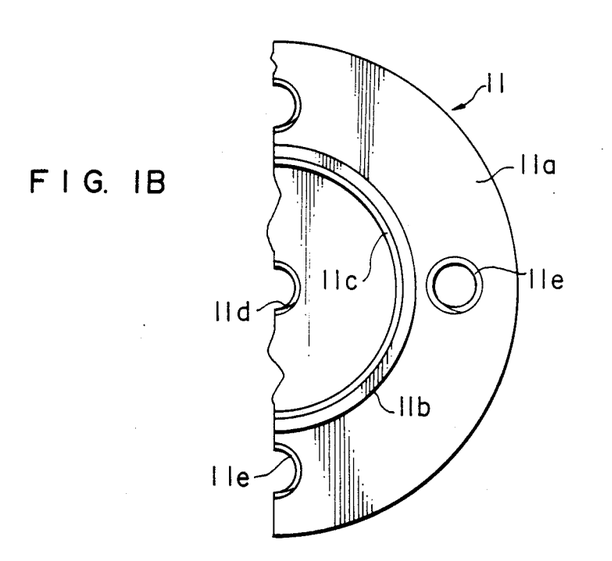
FIG. 1B is a front view showing an embodiment of the drawing member of the jig according to the present invention.

A drawing member 11 illustrated in FIGS. 1A and 1B has a disk-shaped drawing body 11a and a cylindrical nut portion 11b extending from the drawing body 11a. The diameter of the drawing body 11a is substantially equal to the outer diameter of a housing described below. The cylindrical nut portion 11b has a nut screw 11c at an end thereof. The nut screw 11c can engage with a screw of a tapered adapter sleeve 3. A central screw hole 11d is arranged at the center of the drawing body 11a. A plurality of peripheral screw holes 11e are arranged outside of the cylindrical nut portion 11b. A central bolt 12a and peripheral bolts 12b are fitted in the central screw hole 11d and in the peripheral screw holes 11e, respectively.

Figure 2A:
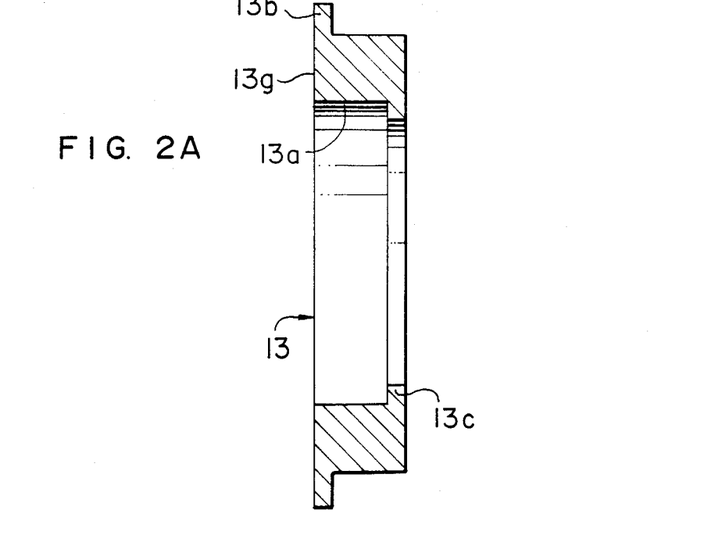
FIG. 2A is a cross-sectional view showing an embodiment of the positioning member of the jig according to the present invention.
Figure 2B:
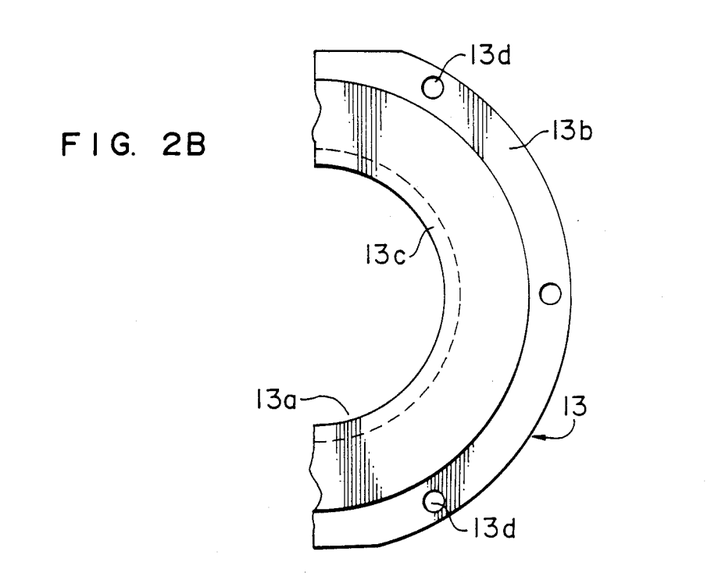
FIG. 2B is a front view showing an embodiment of the positioning member of the jig according to the present invention.

A ring-shaped positioning member 13 illustrated in FIGS. 2A and 2B has a inner hole 13a receiving the cylindrical nut portion 11b, an outer flange 13b contacting with a forward end surface of the housing, and an inner flange 13c contacting with the end of the cylindrical nut portion 11b and having a positioning surface contacting with an end of inner ring of bearing. If necessary, the positioning surface also contacts with an end of outer ring of bearing. The outer flange 13b has a plurality of bolt through-hole 13d.

Figure 3:
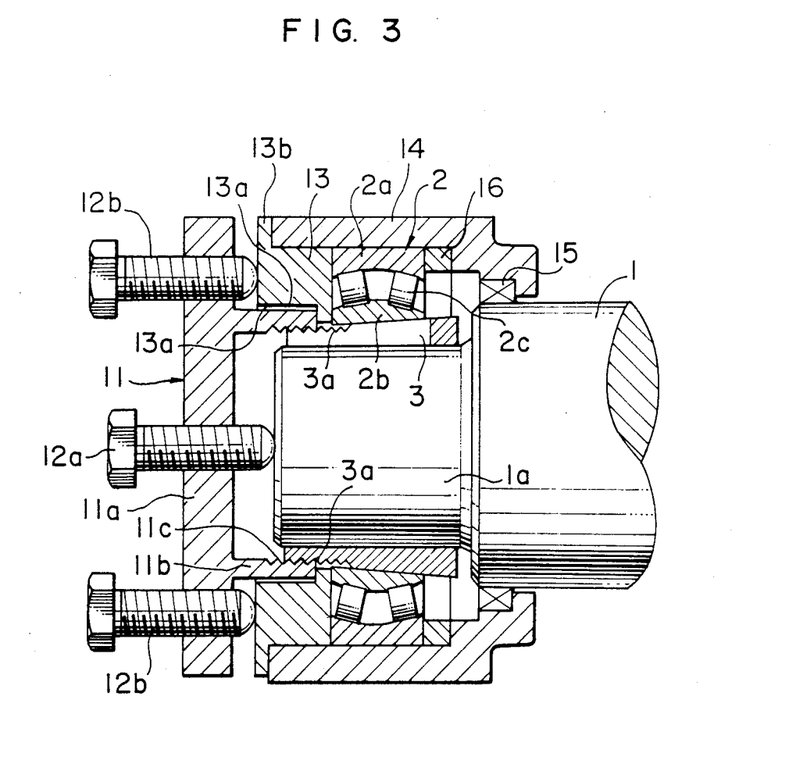
FIG. 3 is a cross-sectional view showing an embodiment of the jig according to the present invention, in which the jig is attached to a housing and engages with a tapered adapter sleeve.

When a jig including the drawing member 11 and the positioning member 13 is used, a shaft end 1a of a shaft 1 is inserted in a bearing housing 14 in which an oil-seal ring 15 and a spacer ring 16 are mounted. Subsequently, the tapered adapter sleeve 3 on which a bearing 2 is coaxially fitted is arranged coaxially on the shaft end 1a. The small diameter sides of the tapered adapter sleeve 3 and of the tapered bore of the bearing 2 are arranged toward the axial edge of the shaft end 1a. The positioning member 13 is attached to the housing 14 through the outer flange 13b which is fixed on a forward end surface of the housing 14 by bolts. The positioning surface of the positioning member 13 contacts with an axial end of an inner ring 2b of the bearing 2. If necessary, the positioning surface also contacts with an axial end of an outer ring 2a of the bearing 2. Subsequently, the cylindrical nut portion 11b is inserted in the inner hole 13a and the nut screw 11c is engaged with a screw 3a of the tapered adapter sleeve 3. The peripheral bolts 12b are rotated by the suitable torque so that the tapered adapter sleeve 3 is moved toward the positioning member for generating the strong fixing forces between the tapered bore of the bearing 2 and the tapered adapter sleeve 3 and between the tapered adapter sleeve 3 and the shaft end 1a. The slits of the tapered adapter sleeve 3 provides for radial flexibility thereof. The suitable torque for the peripheral bolts 12b is determined on the basis of the permissible minimum bearing clearance. The bearing clearance is measured between the inner ring 2b and the rolling elements 2c and between the outer ring 2a and the rolling elements 2c. Simultaneously with the rotations of the peripheral bolts 12b, the central bolt 12a is rotated in accordance with the rotations of the peripheral bolts 12b so that the shaft 1 is prevented from moving axially in accordance with the axial movement of the tapered adapter sleeve 3.

Figure 4:
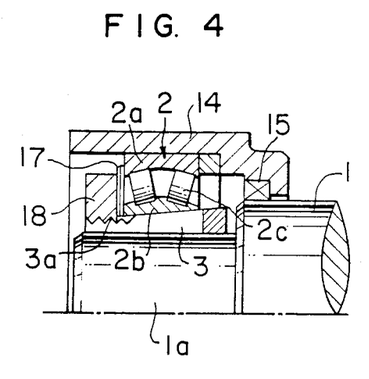
FIG. 4 is a cross-sectional view showing a bearing fixed on a rotational shaft and in the housing.

After fixing the bearing 2, the drawing member 11 and the positioning member 13 are removed. The tapered adapter sleeve 3 is fixed by an adapter nut 18 through a conventional spring washer 17, as shown in FIG. 4.

Figure 5:
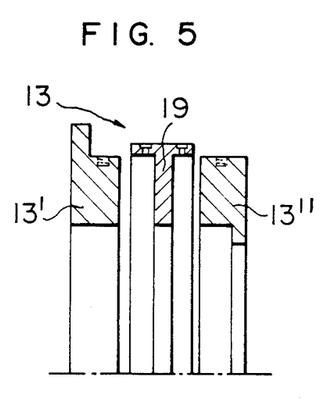
FIG. 5 is a cross-sectional view showing another embodiment of the positioning member of the jig according to the present invention.
Figure 6:
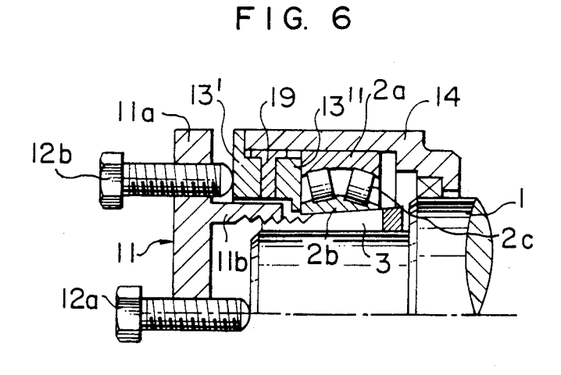
FIG. 6 is a cross-sectional view showing the jig including the positioning member illustrated in FIG. 5.

As shown in FIG. 5, the positioning member may include a first portion 13' attached to the housing 14, a second portion 13" having the positioning surface and a spacer ring 19 arranged therebetween. The width of the spacer ring 19 is varied so that the position of the bearing 2 is varied, as shown in FIG. 6.

Figure 9A:
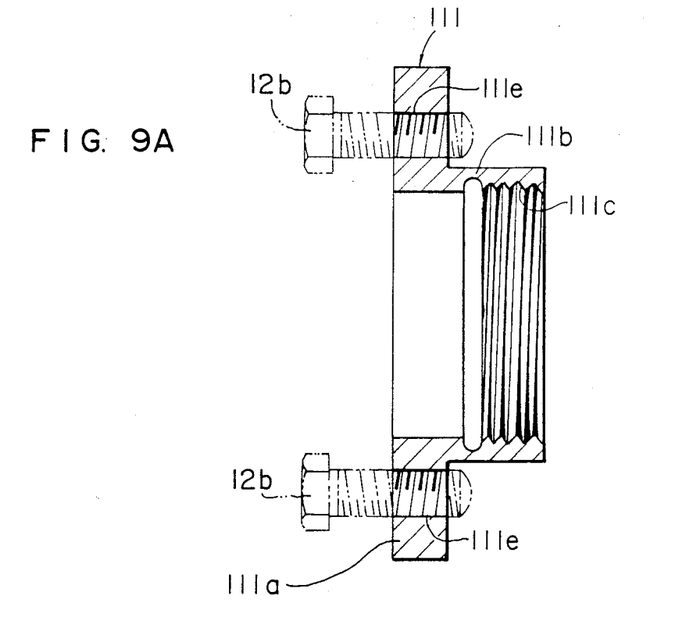
FIG. 9A is a cross-sectional view showing another embodiment of the drawing member of a jig according to the present invention.
Figure 9B:
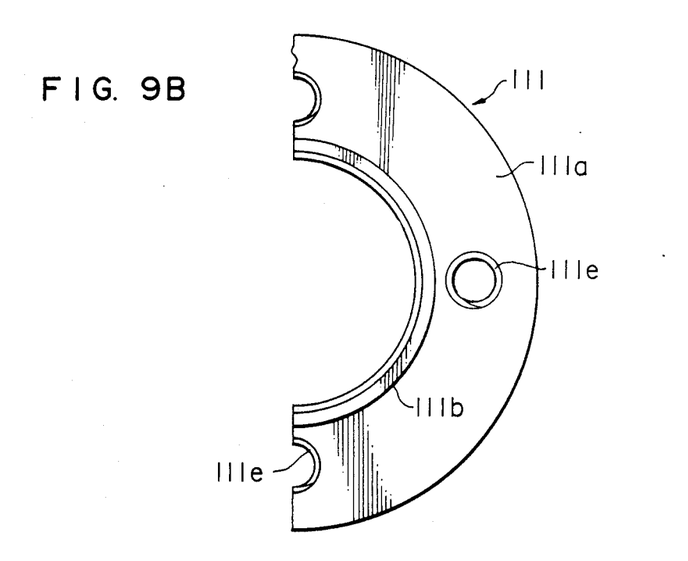
FIG. 9B is a front view showing another embodiment of the drawing member of a jig according to the present invention.

In FIG. 9A and FIG. 9B showing a drawing member 111 used as an alternative to the drawing member 11, the drawing member 111 has an opening through which the shaft 1 can extend outwardly. Therefore, the bearing 2 can be fixed on the shaft 1 by the jig if the shaft 1 extends to the outside of the housing 14. The structure of the drawing member 111 other than the opening is similar to the structure of drawing member 11.

Figure 10A:
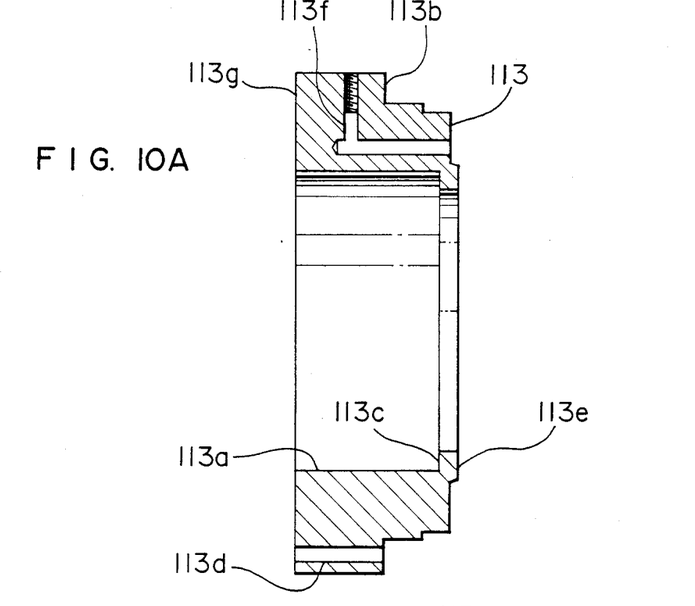
FIG. 10A is a cross-sectional view showing another embodiment of the positioning member of jig according to the present invention.
Figure 10B:
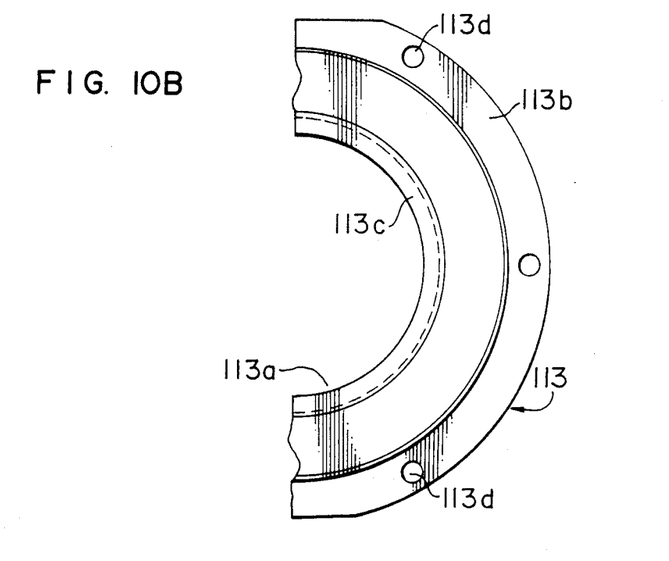
FIG. 10B is a front view showing another embodiment of the positioning member of a jig according to the present invention.

In FIG. 10A and FIG. 10B showing a positioning member 113 used as an alternative to the positioning member 13, structural differences between the positioning member 113 and the positioning member 13 are a grease supplying hole 113f and a positioning surface 113e projecting axially. The grease supplying hole 113f opens to the radial outside of the positioning surface 113e so that the grease can be inserted appropriately between the inner ring and outer ring of the bearing 2 through the grease supplying hole 113f during or after fixing of bearing. Since the bearing 2 is arranged in the housing 14, a jig is generally used for inserting the grease between the inner ring and outer ring of the bearing 2 after the fixing of bearing. But, according to the present invention, the jig for fixing the bearing may have the grease supplying hole 113f so that the grease can be easily and appropriately inserted between the inner ring and outer ring of the bearing 2. Since the positioning surface 113e projects axially, the positioning surface 113e contacts only with the end of the inner ring of the bearing to position the inner ring of the bearing axially and does not contact with the end of the outer ring of the bearing so that both of ends of the inner and outer rings are not positioned on a plane perpendicular to the axis. Therefore, an over-capacity load is prevented from being applied to the rolling elements of bearing during the fixing operation of the bearing.

Figure 11:
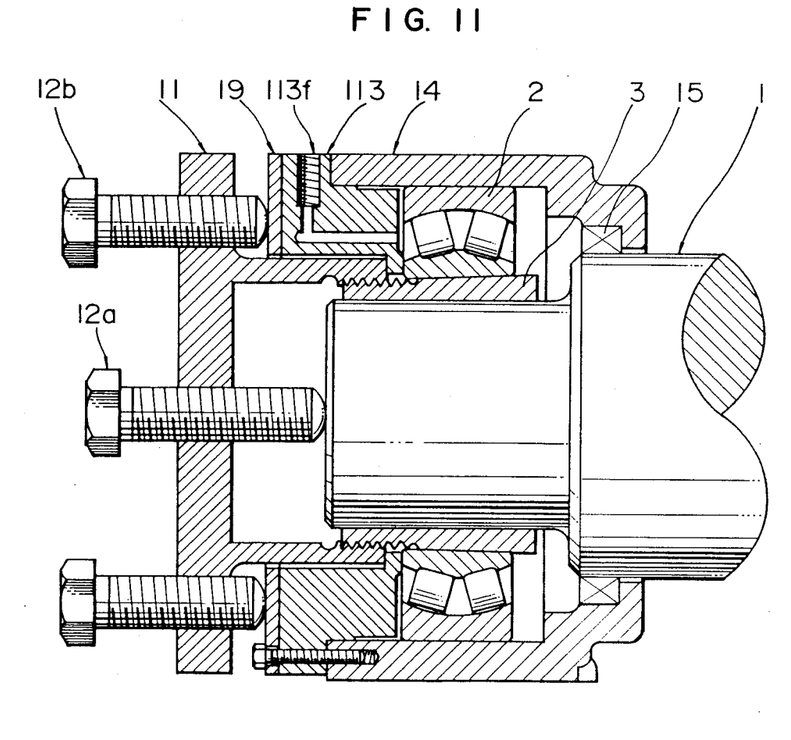
FIG. 11 is a cross-sectional view showing another embodiment of a jig according to the present invention, in which the jig is attached to a housing and engages with a tapered adapter sleeve.
Figure 12:
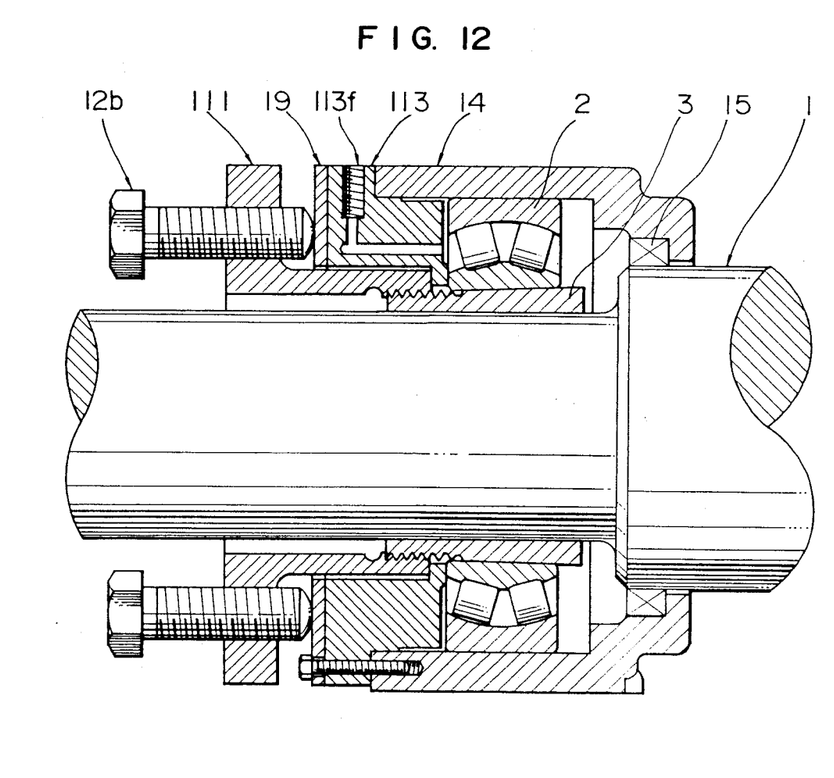
FIG. 12 is a cross-sectional view showing the other embodiment of a jig according to the present invention, in which the jig is attached to a housing and engages with a tapered adapter sleeve.

In FIG. 11 and FIG. 12 showing the jig for fixing the bearing according to the present invention, a spacer 19 is arranged between the positioning member 113 including the grease supplying hole 113f and the drawing member 11 or 111. The bolts 12b press the positioning member 113 through the spacer 19 to move the drawing member 11 or 111. The spacer 19 prevents an end surface 113g of the positioning member from being damaged by the pressing forces of the bolts 12b. The damaged spacer 19 is exchanged for the new spacer 19. The spacer 19 may be arranged between the positioning member 13 and the drawing member 11 or 111.

What is claimed is:

1. A jig for fixing a bearing with a tapered bore through a tapered adapter sleeve on a rotational shaft, comprising:

a positioning member for attaching to a housing which receives the bearing, said positioning member having a positioning surface for positioning the bearing in the axial direction, the positioning surface contacting with an end of an inner ring of the bearing, the end of the inner ring being located on the small diameter side of the tapered bore; and drawing means which engages with the tapered adapter sleeve and has driving means for moving said drawing means axially so that the tapered adapter sleeve is moved toward said positioning member for generating strong fixing forces between the tapered bore and the tapered adapter sleeve and between the tapered adapter sleeve and the shaft.

2. A jig according to claim 1, wherein said drawing means further comprises shaft pressing means for varying the distance between the drawing means and the shaft so that the bearing can be positioned relative to the shaft.

3. A jig according to claim 1, wherein said positioning member further comprises an outer ring positioning surface which contacts with an end of an outer ring of the bearing, the end of the outer ring being located on the small diameter side of the tapered bore so that the outer ring can be positioned in the housing.

4. A jig according to claim 1, wherein the driving means comprises a plurality of pressing members arranged around the axis of the shaft.

5. A jig according to claim 2, wherein the shaft pressing means is arranged on the axis of the shaft.

6. A jig according to claim 1, wherein said positioning member includes a first portion attached to the housing, and a second portion having the positioning surface and a spacer ring arranged therebetween, the width of the spacer ring being varied so that the position of the bearing is varied.

7. A jig according to claim 1, wherein said positioning member has a grease supplying hole opening to the outer radial periphery of the positioning surface so that grease can be supplied to the bearing through the grease supplying hole on fixing the bearing.

8. A jig according to claim 1, wherein said positioning member has an opening through which the shaft can extend outwardly.

9. A jig according to claim 1, wherein the positioning member is sized such that the positioning surface contacts only with the inner ring of the bearing and does not contact with the outer ring of the bearing.

10. A jig according to claim 1, wherein the driving means has bolts engaging with said drawing means and a spacer arranged between said drawing means and said positioning member, the bolts pressing said positioning member through the spacer to move said drawing member axially.

11. A jig for fixing a bearing with a tapered bore through a tapered adapter sleeve on a rotational shaft, comprising:

positioning means for positioning the bearing in an axial direction, said positioning means being adapted for attaching to a housing which receives the bearing, and said positioning means including a positioning surface which contacts with an end of an inner ring of the bearing which is located toward the small diameter side of the tapered bore;

drawing means for engaging with the tapered adapter sleeve, said drawing means inter-engaging with said positioning means; and driving means operatively connected to said drawing means for moving said drawing means along the axial direction such that the tapered adapter sleeve is drawn toward said positioning means and that strong fixing forces are generated between the tapered bore and the tapered adapter sleeve, and between the tapered adapter sleeve and the rotational shaft.

* * * * *